F. A. HUNTER.
METAL CUTTING SAW.
APPLICATION FILED OCT. 27, 1911.
1,037,146.
Patented Aug. 27, 1912.
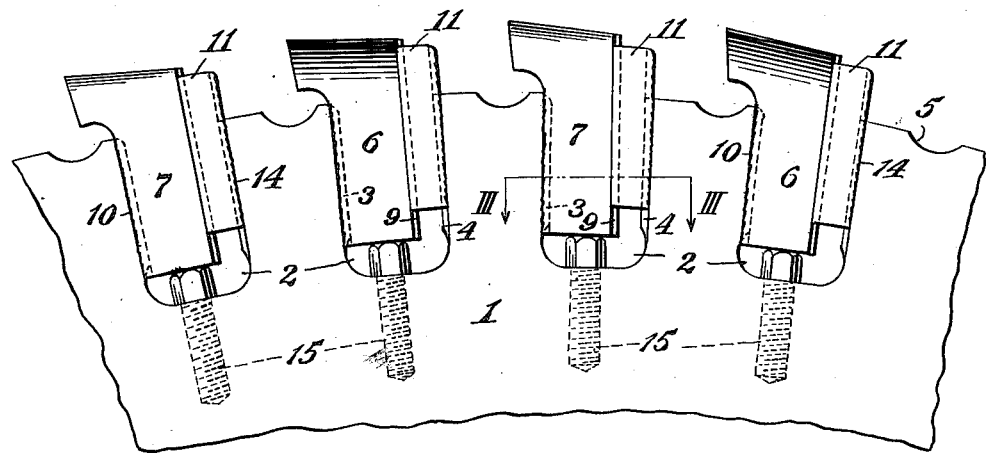
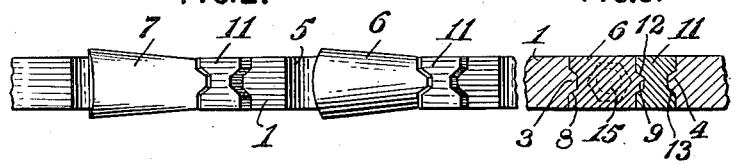
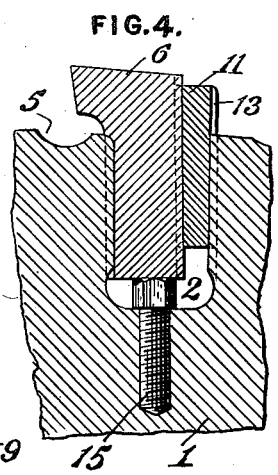
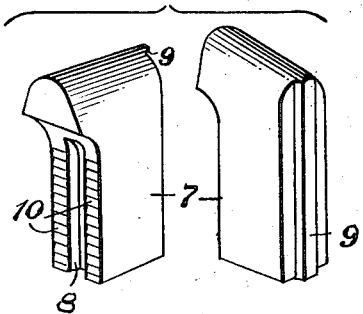
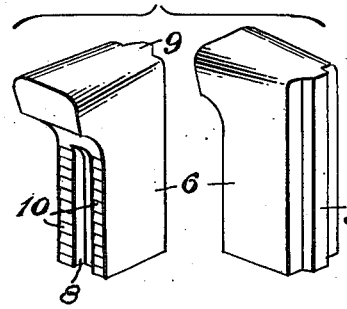
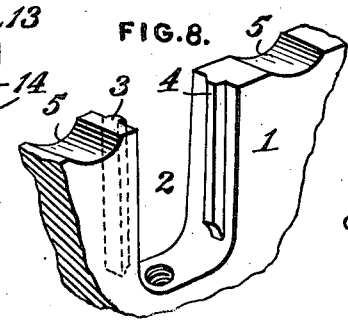

UNITED STATES PATENT OFFICE.

FRANK A. HUNTER, OF PITTSBURGH, PENNSYLVANIA.

METAL-CUTTING SAW.

1,037,146.

Specification of Letters Patent.  Patented Aug. 27, 1912.

Application filed October 27, 1911. Serial No. 657,047.

*To all whom it may concern:*

Be it known that I, FRANK A. HUNTER, of Pittsburgh, in the county of Allegheny and State of Pennsylvania, have invented certain new and useful Improvements in Metal-Cutting Saws, of which the following is a specification.

Among the objects of my invention are to provide a new and improved saw having insertible teeth and particularly designed for sawing metal; to provide a saw in which a greater number of teeth is employed without weakening the blade, to a given diameter of blade, than has heretofore been possible; a construction in which the insertible teeth are maintained in operative positions in the teeth receiving recesses of the blade by wedges, which latter extend substantially throughout the length of the teeth and project beyond the periphery of the blade; and, further, to provide a face of each tooth and a face of each wedge with a gripping surface respectively designed to engage the front and rear walls of the teeth receiving recesses.
In the accompanying drawing, which illustrates an application of my invention, Figure 1 is a side elevation of a portion of a metal cutting saw embodying my invention; Fig. 2, a plan of the same; Fig. 3, a horizontal sectional view taken on line III—III of Fig. 1; Fig. 4, a detail vertical sectional view of an insertible tooth and wedge located in a recess of the saw-blade; Fig. 5, a perspective view particularly showing the front and rear faces of a roughing tooth; Fig. 6, a view similar to Fig. 5 showing a finishing tooth; Fig. 7, a perspective view of a wedge; and Fig. 8, a perspective view showing a recess of the blade.

Referring to the drawing, 1 designates the blade or body of the saw having on its periphery a series of recesses 2. The walls of the respective recesses are provided with tongues, ribs or male engaging members, that is to say, the front wall of the recess is formed with a member 3, and the rear wall with a member 4. Between the teeth receiving recesses or sockets, I preferably form the periphery of the saw-blade with cut-out portions 5 for the purpose of preventing clogging during the cutting operation.

6 designates a roughing tooth and 7 a finishing tooth. These teeth 6 and 7 are designed to be alternately arranged in the teeth receiving recesses 2, and are each formed on its front face with a groove 8 adapted to receive the tongue or male member 3 when the teeth are placed in the respective recesses 2. Each of said teeth 6 and 7 is provided with a tongue or rib 9 on its rear face, and in addition to the groove 8 and the rib 9, the forward face of each tooth is cross-planed to provide a gripping surface, as clearly indicated by the numeral 10.

11 is a wedge adapted to be mounted in each recess back of the tooth, and said wedge is formed on its outer forward face with a groove 12 and on its rear face with a groove 13 adapted to respectively receive the rib or tongue 9 of the tooth and the rib or tongue 4 of the rear wall of the recess. The wedge 11 is slightly tapered, being of slightly greater width at its outer end than at its inner end, and is of such a length as to extend almost entirely throughout the length of the shank of the tooth and project from the periphery of the blade up along the top or heel of the tooth, thereby affording an efficient support for that portion of the tooth located within the recess as well as the portion extending beyond the periphery of the blade. In order to provide a gripping effect between the rear wall of the recess 2 and the wedge, the wedge is formed with a gripping surface 14 similar to the surface 10 on the front face of the teeth.

The teeth are adjustably mounted on screws 15 located in the saw-body and having their heads projecting into the recesses 2.

The saw illustrated by Fig. 1, represents a saw-blade or body having a fourteen and one-half inch radius with fifty-two teeth receiving recesses adapted, of course, to receive fifty-two teeth.

What I claim is:

1. In a metal cutting saw, a blade having a recess formed in its periphery, said recess having a rib on opposite walls thereof, an adjusting screw having its shank entered in the blade body, a tooth in the recess mounted on the adjusting screw, said tooth having its front face grooved and its rear face provided with a rib, and a wedge mounted in the recess back of and engaging the tooth and projecting beyond the periphery of the blade, said wedge being wider at its outer end than at its inner end, and having a groove on its front face to receive a rib of the tooth, and a groove on its rear face to receive a rib of the blade.

2. In a metal cutting saw, a blade having a recess formed in its periphery, said recess having a rib on opposite walls thereof, an adjusting screw having its head located in said recess and its shank entered in the blade, a tooth in the recess mounted on the adjusting screw, said tooth having its front face grooved and cross-planed, and its rear face provided with a rib, and a wedge mounted in the recess back of and engaging the tooth and projecting beyond the periphery of the blade, said wedge being wider at its outer end than at its inner end, and having a groove on its front face to receive a rib of the tooth, and its rear face cross-planed and formed with a groove to receive a rib of the blade.

In testimony whereof I affix my signature in presence of two witnesses.

FRANK A. HUNTER.

Witnesses:
   F. E. GAITHER,
   W. G. DOOLITTLE.